United States Patent [19]
Satake et al.

[11] Patent Number: 5,694,027
[45] Date of Patent: Dec. 2, 1997

[54] THREE-PHASE BRUSHLESS SELF-EXCITED SYNCHRONOUS GENERATOR WITH NO ROTOR EXCITATION WINDINGS

[75] Inventors: Satoru Satake, Tokyo; Kenji Inoue, Hiroshima; Yukio Onogi, Hiroshima; Hideo Yamashita, Hiroshima; Yukio Hosaka, Hiroshima, all of Japan

[73] Assignee: Satake Corporation, Tokyo, Japan

[21] Appl. No.: 569,478

[22] Filed: Dec. 8, 1995

[30] Foreign Application Priority Data

Dec. 8, 1994 [JP] Japan .................. 6-331908

[51] Int. Cl.⁶ .................................. H02P 9/14
[52] U.S. Cl. .................... 322/63; 322/90; 322/20
[58] Field of Search ............... 322/20, 28; 310/68 R

[56] References Cited

U.S. PATENT DOCUMENTS

| | | | |
|---|---|---|---|
| 4,223,263 | 9/1980 | Hansen, Jr. et al. | 322/47 |
| 4,723,106 | 2/1988 | Gibbs et al. | 322/26 |
| 4,887,020 | 12/1989 | Graham | 322/63 |
| 5,239,254 | 8/1993 | Inoue et al. | 322/86 |
| 5,345,125 | 9/1994 | Raad | 310/68 A |

FOREIGN PATENT DOCUMENTS 3-245755  11/1991  Japan .

*Primary Examiner*—Steven L. Stephan
*Assistant Examiner*—Nicholas Ponomarenko
*Attorney, Agent, or Firm*—Fish & Richardson P.C.

[57] ABSTRACT

On a stator core, there are wound T-connection primary generating windings such that the second and third single-phase windings are respectively arranged at positions electrically orthogonal to the first single-phase winding. The winding number of the first single-phase winding is 3½ times that of the second single-phase winding or the third single-phase winding. The stator excitation windings are also wound on the stator core, which are connected to the center taps of the primary generating windings through a control rectifier. A plurality of field windings are wound on a rotor core. The field windings are arranged at positions where they are magnetically coupled with both the odd-order spatial higher harmonic components of armature reaction magnetic fields produced by currents flowing in the primary generating windings and the static magnetic fields produced by current flowing in the stator excitation windings. Due to the T-connection primary generating windings, the generator is capable of simultaneously generating not only the three-phase outputs but also the single-phase three-line outputs.

9 Claims, 4 Drawing Sheets

THREE-PHASE BRUSHLESS SELF-EXCITED SYNCHRONOUS GENERATOR WITH NO ROTOR EXCITATION WINDINGS

BACKGROUND OF THE INVENTION

(1) Field of the Invention

The present invention relates to a brushless self-excited synchronous generator which is capable of generating voltages of flat-compound characteristics against load variations and in which the output voltages respectively at non-loaded state and loaded state are freely controllable, and more particularly to a three-phase self-excited synchronous generator which is simple and rigid in its structure, in which magnetic vibrations and noise are reduced, and from which three-phase output or single-phase output can be easily obtained.

(2) Description of the Related Art

A brushless self-excited synchronous generator which has a series excitation function internally and which is capable of outputting a voltage of flat-compound characteristics is disclosed in, for example, Japanese Patent Application Kokai Publication No. Hei 3-245755. FIG. 1 diagrammatically shows a circuit of such a brushless self-excited synchronous generator disclosed in the above Publication No. Hei 3-245755.

Referring to FIG. 1, an explanation is made on the brushless self-excited synchronous generator disclosed in the Publication No. Hei 3-245755. On a stator iron core 20, there are wound primary generating windings U, V, W of two poles (in this embodiment) having a concentrated full-pitch or its corresponding winding structure, and stator field windings 21 having the number of poles five times (in this embodiment) that of the primary generating windings, that is, ten poles (in this embodiment). On a rotor iron core 22, there are wound rotor field windings 23 which have the same number of poles as that of the primary generating windings, that is, two poles (in this embodiment) and rotor excitation windings 24 which have the same number of poles as that of the stator field windings 21, that is, ten poles and which are magnetically coupled with fifth-order spatial higher harmonic components (ten-poles magnetic fields) of the armature reaction magnetic fields produced by the currents in the primary generating windings. Center tap terminals u, v, w, respectively, provided on the primary generating windings U, V, W are connected to the stator field windings 21 through a control rectifier device VR which is formed by a three-phase full-wave rectifier 25 and a variable resistor $R_f$. The rotor excitation windings 24 are connected to the rotor field windings 23 through a diode bridge circuit 26.

Now, actual operation of the above brushless self-excited generator is explained. When the rotor is rotated, electromotive forces are induced in the primary generating windings U, V, W due to the residual magnetism in the rotor iron core 22. Alternating currents (AC) flow in the primary generating windings U, V, W dependent on the induced electromotive forces. The induced electromotive forces are also applied, after having been rectified by the three-phase full-wave rectifier 25, to the stator field windings 21 so that a direct current (DC) $I_{fs}$ flows in the stator field windings 21. In the rotor excitation windings 24, there are induced overlapped electromotive forces the magnitude of which depends on the static magnetic field produced by the DC current $I_{fs}$ flowing in the stator field windings 21 and those based on the fifth-order harmonic components of the armature reaction magnetic field produced by the AC currents flowing in the primary generating windings. The overlapped electromotive forces thus induced are rectified by the diode bridge circuit 26 so that a direct current $I_f$ flows in the rotor field windings 23. As a result, the primary magnetic fields increase and the electromotive forces induced in the primary generating windings increase accordingly. The value of the output voltage is self-established based on the repetition of the operation explained above. In the case where the residual magnetism in the rotor iron core 22 is insufficient, a starting or initial excitation may be carried out by a battery B.

In the above brushless self-excited synchronous generator, in accordance with the increase or decrease in the three-phase resistor loads or inductive loads (lagging power factor), the fifth-order spatial higher harmonic components of the armature reaction magnetic fields increase or decrease in proportion to the increase or decrease in the load currents and, as a result, the DC currents $I_f$ in the rotor field windings 23 increase or decrease, whereby the fluctuations of the output voltages are suppressed. Thus, the generator can produce an output voltage of the flat-compound characteristics with respect to the increase or decrease in the loads. In the case where three-phase unbalanced loads or single-phase loads are connected to the above generator, though the series excitation effects due to the fifth-order spatial higher harmonic components of the armature reaction magnetic fields will be lowered as compared with the case of the three-phase balanced loads, electromotive forces are induced in the rotor field windings 23 by the spatial fundamental component of opposite phase of the armature reaction magnetic fields at the three-phase unbalanced loads or the single-phase loads. Since the induced electromotive forces are half-wave rectified by the diode bridge circuit 26 and compensate the reduced amount of the DC current $I_f$ in the rotor field windings 23, which is caused by the decrease of the series excitation effects, the generator at the three-phase unbalanced or single-phase load state exhibits the same flat-compound characteristic as in the three-phase balanced load state. Further, with the above brushless self-excited generator, the output voltages respectively at the non-loaded and loaded states can be freely controlled by the control of the variable resistor $R_f$ connected to the stator field windings 21 in series.

One method to obtain single-phase output from the three-phase synchronous generator is to provide a tap on the one given windings among three-phase primary generating windings. With this method, a single-phase two-line output can be derived between the tap and the three-phase neutral point. Another method is to provide a single-winding transformer between given two output terminals among the three-phase output terminals of the three-phase generator. With this method, single-phase three-line output can be derived from the transformer.

The fact wherein single-phase two-line output or single-phase three-line output other than three-phase output can be obtained from the three-phase generator means that only one generator can cope with many variety of loads. However, in the case where single-phase two-line output is obtained from the three-phase generator, it is necessary to provide a tap on the one of the primary generating windings. In this case, winding loss at the stator windings of the generator becomes large as compared with the case of the single-phase three-line system. In the case of the single-phase three-line output, the provision of the separate single-winding transformer to the generator leads to cost-up. Further, where the single-phase load is connected to the three-phase generator, there occurs a distortion in the waveform of the output voltages caused by the flow of the third-order harmonic currents.

The brushless self-excited synchronous generator disclosed in the above Publication No. Hei 3-245755 has the following defects.

The problem is that two kinds of windings, that is, rotor field windings and rotor excitation windings need be wound on a rotor iron core. The need for a plurality of kinds of windings to be wound on the rotor iron core inevitably makes the rotor structure complex. Further, the mechanical strength of the rotor is lowered. Moreover, the possibility that such accident as short-circuiting or burning caused by the deterioration of insulation becomes high. Therefore, it is desirable that windings of a single kind be wound on the rotor iron core for the purpose of enhancing rigidity and reliability of the generator.

Further, since the above brushless self-excited synchronous generator adopts a method wherein the series excitation effects are obtained by using a specific order harmonic component among the spatial higher harmonic components of the armature reaction magnetic fields produced by the primary generating windings, the number of poles of the rotor excitation windings which are magnetically coupled with the spatial higher harmonic component of the specific order and that of the stator field windings which are magnetically coupled with the rotor excitation windings must be the same number as the number of poles of the specific order harmonic component. For example, in the three-phase two-pole generator, where the fifth-order spatial higher harmonic component of the armature reaction magnetic fields is used as the series excitation effects, the number of poles of both the stator field windings and the rotor excitation windings is required to be ten (10) poles, while in the three-phase four-pole generator, it is required to be twenty (20) poles. For this reason, the number of slots provided in the stator core and the rotor core on which the above windings are wound is limited to a certain specific number according to the specific order of the spatial higher harmonic components used for the series excitation effects of the field system.

In the case where the number of slots provided in each of the stator and rotor cores must be limited to a specific number as above, there arises the following problem. In a rotary machine, there is a possibility that a large amount of magnetic vibrations or noise occur depending on some combinations of the number of slots in the stator core and the number of slots in the rotor core. Therefore, in the rotary machines, generally, the combination of the number of slots in each of the stator and rotor cores is so selected that the magnetic vibrations and noise become small. However, in the above explained brushless self-excited synchronous generator, since the number of slots in each of the stator and rotor cores is limited to a certain specific number which is determined by the selected order of the harmonic components, it is not possible to freely select the combination of the numbers of slots for the purpose of reducing the magnetic vibrations and noise. As a result, there has been a possibility that a great amount of magnetic vibrations and noise occur depending on the combination of the slot numbers which are determined by the specific order used of the spatial higher harmonic components.

Further, in the above brushless self-excited synchronous generator, it is well known that as the number of order of the odd-order spatial higher harmonic components of armature reaction magnetic fields becomes high, the output voltages of higher frequency can be induced and that, as the frequency becomes high, the leakage reactance increases so that the current has a difficulty to flow in the circuit. For this reason, it is desirable that the number of order of the odd-order spatial higher harmonic components to be used is as low as possible. However, in the conventional brushless self-excited synchronous generator, only more than fifth-order harmonic components among the odd-order spatial higher harmonic components have been used but the third-order spatial harmonic component lower than the above fifth-order has not been used. This is because the third-order spatial higher harmonic components cancel with each other within the three-phase circuit and cannot be used. For the purposes of reducing the leakage reactance caused by the spatial higher harmonic components and effectively utilizing the odd-order spatial higher harmonic components of armature reaction magnetic fields, the use of the third-order spatial higher harmonic component has been desired. However, in the conventional three-phase generating circuits, there is no example in which the third-order spatial higher harmonic component has been used.

Further, the conventional general purpose generators are largely divided into two, one being a single-phase generator and the other being a three-phase generator. It is of course that only single-phase load can be connected to the single-phase generator but three-phase load cannot be connected thereto. To the three-phase generator, other than the three-phase balanced loads (or the three-phase unbalanced loads), single-phase load can be connected, as explained hereinabove in the item of the description of the related art, by providing a tap on one phase of the primary generating windings or by connecting a single-winding transformer between the two output terminals of the three-phase output terminals so that single-phase 100 or 200 volts can be derived therefrom.

However, in the case where a tap is provided on the one phase windings among three, not only it necessitates the drawing out the additional output terminal for obtaining the single-phase 100 volts but also the winding loss increases because the currents for the single-phase load flows in only the one phase windings among three. On the other hand, in the case where the single-phase transformer is provided between the given two output terminals of the generator, though the winding loss is small as compared with the case of the provision of a tap explained above, the provision of the single-winding transformer inevitably makes the overall structure of the generator large and makes the cost high.

SUMMARY OF THE INVENTION

An object of the present invention is, therefore, to provide a three-phase brushless self-excited synchronous generator which needs no rotor excitation windings on the rotor and in which the number of slots provided in the rotor can be determined irrespective of the order number of the spatial higher harmonic components of the armature reaction magnetic fields.

Another object of the invention is to provide a three-phase brushless self-excited synchronous generator from which three-phase outputs or single-phase outputs of 100 volts of single-phase two-line or 200 volts of single-phase three-line can be easily obtained without requiring any additional apparatus such as a transformer.

According to one aspect of the invention, there is provided a three-phase self-excited synchronous generator comprising:

a stator having a stator core, primary generating windings and excitation windings having the number of poles odd-number times the number of poles of the primary generating windings, the primary generating windings having T-connection first, second and third single-phase windings which are connected with one another such that one end of the first single-phase winding is connected to one end each of the second and third single-phase windings which are respectively electrically orthogonal to the first single-phase winding;

a rotor having a rotor core and a plurality of field windings wound on the rotor core, having the same number of poles as that of the primary generating windings, the plurality of field windings being arranged at positions where they are magnetically coupled with both static magnetic fields produced by the excitation windings and odd-order spatial higher harmonic components of armature reaction magnetic fields produced by the primary generating windings;

a control rectifier means connected between the primary generating windings and the excitation windings, for full-wave rectifying electromotive forces induced in the primary generating windings so that direct currents flow in the excitation windings; and a plurality of semiconductor rectifier elements respectively connected in series to the plurality of field windings, for half-wave rectifying electromotive forces respectively induced in the plurality of field windings so that DC currents flow in the plurality of field windings.

According to another aspect of the invention, there is provided a three-phase self-excited synchronous generator comprising:

a stator having a stator core, primary generating windings and excitation windings having the number of poles odd-number times the number of poles of the primary generating windings, the primary generating windings having T-connection first, second and third single-phase windings which are connected with one another such that one end of the first single-phase winding is connected to one end each of the second and third single-phase windings which are respectively electrically orthogonal to the first single-phase winding;

a variable reactor whose reactor excitation current is controllable and which is connected in parallel together with loads to output terminals of the primary generating windings;

a rotor having a rotor core and a plurality of field windings wound on the rotor core, having the same number of poles as that of the primary generating windings, the plurality of field windings being arranged at positions where they are magnetically coupled with both static magnetic fields produced by the excitation windings and odd-order spatial higher harmonic components of armature reaction magnetic fields produced by the primary generating windings; and a plurality of semiconductor rectifier elements respectively connected in series to the plurality of field windings, for half-wave rectifying electromotive forces respectively induced in the plurality of field windings so that DC currents flow in the plurality of field windings.

In more detail, the plurality of field windings are wound on the rotor core, that is, wound sequentially in a given number of slots provided with regular intervals in the rotor core, in such a manner that the individual field windings have the same pole pitch, that is, 180° in the electric angle as that of the primary generating windings. It should be noted that the number of windings of the first single-phase winding among the primary generating windings is 3½ times those of the second and third single-phase windings.

Now, the operation of the generator according to the above first aspect of the invention is explained. When the rotor is rotated, slight electromotive forces are induced in the primary generating windings due to the residual magnetism in the rotor core. The induced eletromotive forces influence on the primary magnetic fields produced by the field windings of the rotor through the following two functions.

One function is as follows. Since the first single-phase winding among the three-phase primary generating windings and the second and third single-phase windings each of which is electrically orthogonal to the first single-phase winding are T-shape connected, the magnetic flux produced by the currents flowing in the individual single-phase windings is of a square wave. The magnetic flux of the square wave after the Fourier transformation reveals that it contains other than the fundamental wave such odd-order spatial higher harmonic components as the third- and fifth-order spatial higher harmonic components. As the plurality of field windings of the rotor are arranged at the positions where they are magnetically coupled with the odd-order spatial higher harmonic components of armature reaction magnetic fields produced by the primary generating windings, the odd-order spatial higher harmonic components and the plurality of field windings of the rotor are magnetically coupled, so that electromotive forces are induced in the field windings of the rotor.

The other function is as follows. The above electromotive forces induced are rectified by the control rectifier means which is formed by the three-phase full-wave rectifier and the variable resistor and which is connected between the primary generating windings and the stator excitation windings, and DC currents flow in the stator excitation windings, thereby forming a static magnetic filed (this static magnetic field resulting in an shunt excitation effect). Since the plurality of field windings of the rotor are arranged at the positions where they are magnetically coupled with the static magnetic field produced by the stator excitation windings, the static magnetic field produced by the excitation windings and the plurality of field windings of the rotor are magnetically coupled, so that electromotive forces are induced in the field windings of the rotor.

The overlapped magnetic fields of the above odd-order spatial higher harmonic components and the static magnetic field cause the electromotive forces to be induced in each of the plurality of field windings of the rotor, which are magnetically coupled with the above static magnetic field and all the odd-order harmonic components. The respective electromotive forces induced in the plurality of field windings are respectively half-wave rectified by the semiconductor rectifier elements which are respectively connected to the field windings, and increase the primary magnetic flux of the rotor core accordingly. Further, the increase in the primary magnetic flux increases the above electromotive forces induced in the primary generating windings, whereby the voltage produced in the primary windings at the non-loaded state is self-established through the repetition of the above operations. Here, since the DC currents to flow in the stator excitation windings can be controlled by the controlling of the above control rectifier means, the voltage at the non-loaded state can be controlled to any given value. In the case where no residual magnetism exists in the rotor core, an initial excitation may be made by the temporary connection of the battery to the stator excitation windings.

When the three-phase resistor or inductive loads are connected to the generator explained above, the output voltages are compensated with respect to the increase in the three-phase loads as follows. Specifically, since the load currents flow to the three-phase loads from the primary generating windings, the armature reaction magnetic fields produced by the primary generating windings due to the load currents increase. Therefore, the odd-order spatial higher harmonic components of the armature reaction magnetic fields increase in proportion to the increase in the load currents and, thus, the increase in the odd-order harmonic components results in the increases in the respective electromotive forces in the plurality of field windings, that is, the increases in the half-wave rectified currents therein. The primary magnetic flux in the rotor core increases and the induced electromotive forces in the primary generating windings increase accordingly. As a result, the voltage drop in the primary generating windings to be caused by the increase in the load currents is compensated by the increase in the induced electromotive forces.

Since the above explained three-phase brushless self-excited synchronous generator adopts a theory wherein the primary flux of the field system increases in proportion to the spatial higher harmonic components of the armature reaction magnetic fields produced by the currents of the primary generating windings, the self-establishment of the output voltage is available in the case where the loads are connected to the primary generating windings and the load currents are flowing therein. Further, in this generator, even in the case where the loads are three-phase unbalanced loads or single-phase loads, since the spatial fundamental component of the opposite phase of the armature reaction magnetic fields newly produced by the three-phase unbalanced currents in the primary generating windings causes electromotive forces to be induced in the plurality of field windings and results in the series excitation effects of the field systems, the decrease in the series excitation effects of the field systems caused by the decrease in the spatial higher harmonic components of the armature reaction field systems which are caused by the three-phase unbalanced currents is compensated. Therefore, the output voltage of the generator is kept substantially constant irrespective of the variations in the loads.

Since the first to third single-phase windings of the primary generating windings are T-shape connected, not only three-phase output can be derived from the three output terminals of the respective single-phase windings but also single-phase three-line output can be derived from the output terminals of the second and third single-phase windings. This means that the structure of the primary generating windings for outputting the three-phase output can also output single-phase 200 volts and single-phase 100 volts simultaneously without no change in the structure. Unlike in the conventional generator, there is no need to provide any additional means with the generator or to provide any additional tap on the primary generating windings.

Next, explanation is made on the operation of the generator according to the above second aspect of the invention, wherein the reactor is used instead of the excitation windings and the control rectifier means which are used in the generator according to the first aspect of the invention. Since the function of the T-connection primary generating windings is the same as that in the generator according to the first aspect of the invention, the explanation thereof is not repeated here. Here, the explanation is focussed on the function of the reactor.

In the generator according to the second aspect of the invention, when the rotor is rotated, slight electromotive forces are induced in the primary generating windings due to the residual magnetism existing in the rotor core. The above electromotive forces induced cause currents to flow in the primary generating windings and also in the reactor which together with the loads is connected in parallel to the output terminals of the primary generating windings. Armature reaction magnetic fields are produced by the above currents, and an electromotive force is induced in each of the plurality of field windings of the rotor, which are magnetically coupled with all the odd-order spatial higher harmonic components of the armature reaction magnetic fields. The respective electromotive forces induced in the plurality of field windings are half-wave rectified by the semiconductor rectifier elements which are respectively connected in series with the field windings, and increase the primary magnetic flux in the rotor core. Further, this increase in the primary magnetic flux leads to the increases in the above electromotive forces in the primary generating windings, and through the repetitions of this operation, the output voltage at the non-loaded state is self-established. Here, in the case where a variable reactor is adopted as the reactor, the output voltage at the non-loaded state can be freely set by the controlling of the current flowing in the variable reactor.

When three-phase resistor loads, inductive loads or capacitive loads are connected to the above generator, the output voltages of the generator with respect to the variations in power factors of the three-phase loads are compensated as follows.

Specifically, since the load currents also flow in the primary generating windings due to the connection of the three-phase loads, there flow, in the primary generating windings, vector sum currents of the load currents and the currents flowing in the reactor. Therefore, due to the effects of the reactor, the currents to flow in the primary generating windings, even if the load currents are constant, increase as the lagging degree of the power factor of the loads increases, while the same currents decrease as the leading degree of the power factor of the loads increases. That is, in this generator, with the advancement of the lagging degree of the power factor of the loads, the currents in the primary generating windings increase and the spatial higher harmonic components of the armature reaction magnetic fields increase, so that the series excitation effects of the field systems increase and the lowering of output voltage is prevented. On the other hand, with the advancement of the leading degree of the power factor of the loads, the currents in the primary generating windings decrease and the spatial higher harmonic components of the armature reaction magnetic fields decrease, so that the series excitation effects of the field systems decrease and the rising of the output voltage caused by the self-excitation phenomena by the phase-advancing currents is prevented. In this way, the generator with loads and the reactor being connected in parallel to the output terminals of the primary generating windings thereof has in itself an automatic voltage control function which is capable of appropriately responding to the variations in the power factor of the loads. Further, in the case where the three-phase unbalanced loads or the single-phase load are connected to the generator, the generator operates in the same way as in the case where the three-phase balanced loads are connected except that the spatial fundamental component of the opposite phase of the armature reaction magnetic fields adds to the series excitation effects of the field systems.

As explained hereinabove, the three-phase brushless self-excited generator according to the present invention does not require rotor excitation windings which are otherwise required in the prior art and has a simply structured rotor formed by field windings and semiconductor rectifier elements. Further, according to the present invention, the magnetic vibrations and noise, which are caused by the combinations of the number of slots in the stator core and that in the rotor core and which have been the problems in the prior art, are effectively prevented from occurring because the combinations of the numbers of the slots are not limited by the number of poles.

Since the first to third single-phase windings of the primary generating windings are T-shape connected, the third-order spatial higher harmonic component which has been cancelled in the conventional three-phase synchronous generator is included in the armature reaction magnetic fields. As a result, large electromotive forces can be produced in the field windings of the rotor by effectively utilizing the third-order spatial higher harmonic component which is the maximum term in the armature reaction magnetic fields. Further, by virtue of the T-connection of the three single-phase windings of the primary generating windings, not only the three-phase output but also the single-phase three-line output can be derived from the specific output terminals of the single-phase windings without any additional device being added to the generator. Furthermore, because of the non-requirement of the rotor excitation windings on the rotor, the time-constant defined by a resistor component R and an inductive component L becomes small, so that the response speed in the control of the output voltage is fast.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
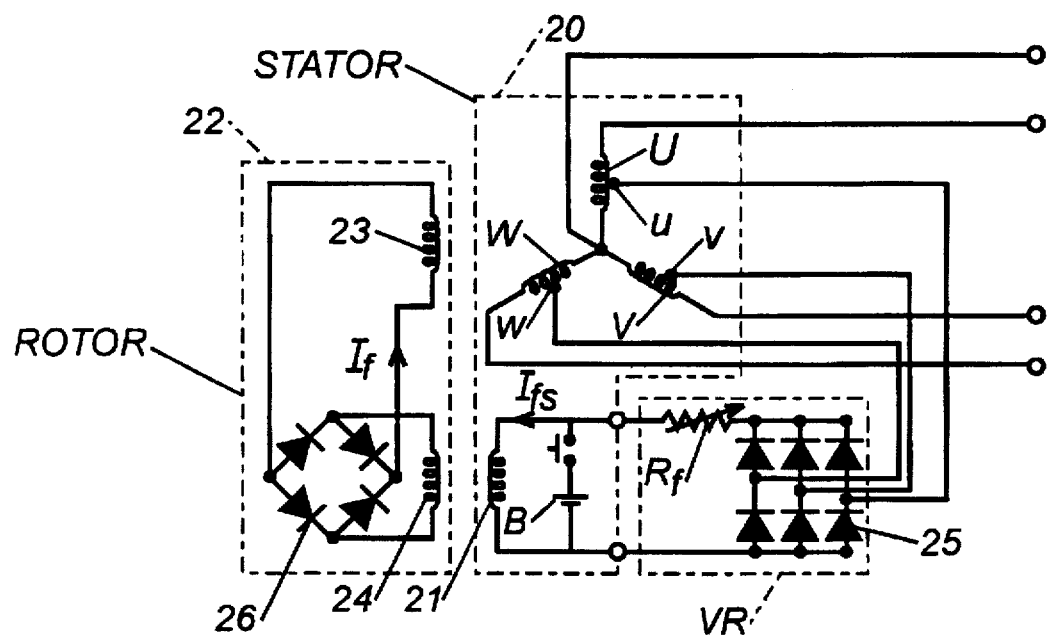
FIG. 1 is a circuit diagram showing an example of a conventional self-excited synchronous generator.
Figure 2:
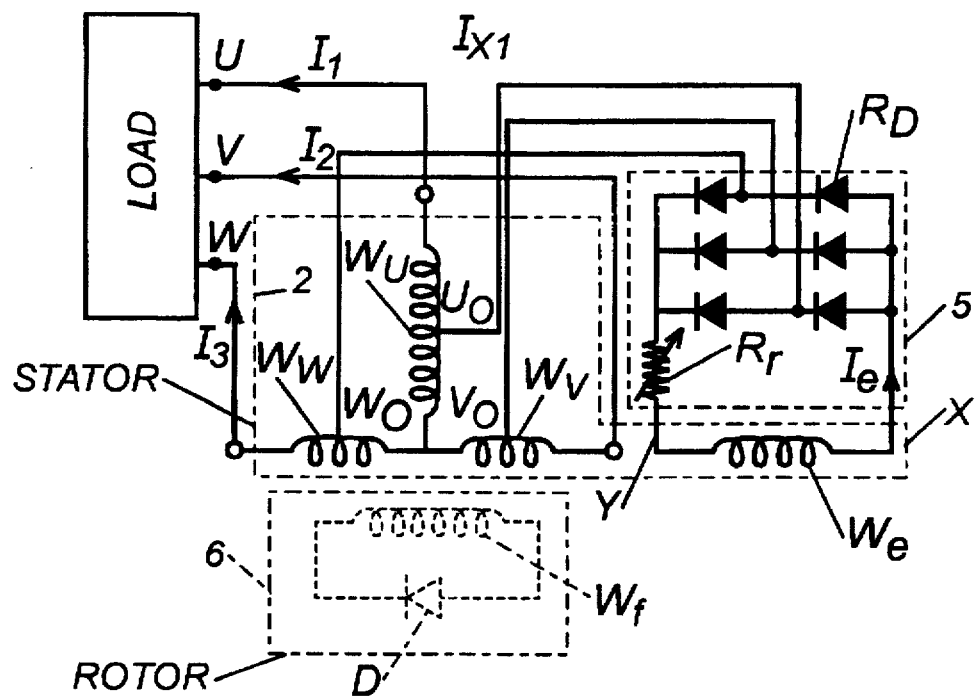
FIG. 2 is a circuit diagram showing a three-phase brushless self-excited synchronous generator of a first embodiment according to the invention.
Figure 3:
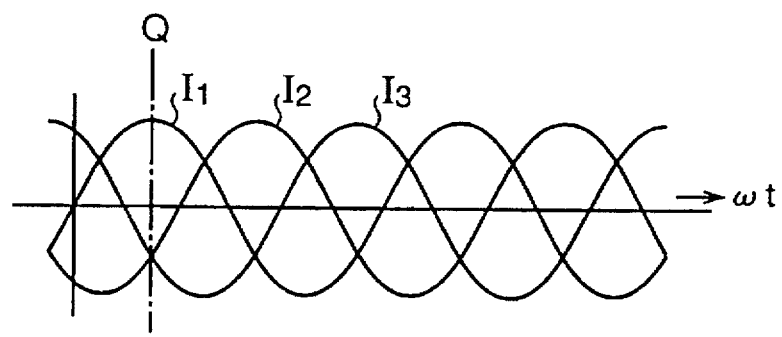
FIG. 3 is a diagram showing current waveforms flowing in the primary generating windings.
Figure 4:
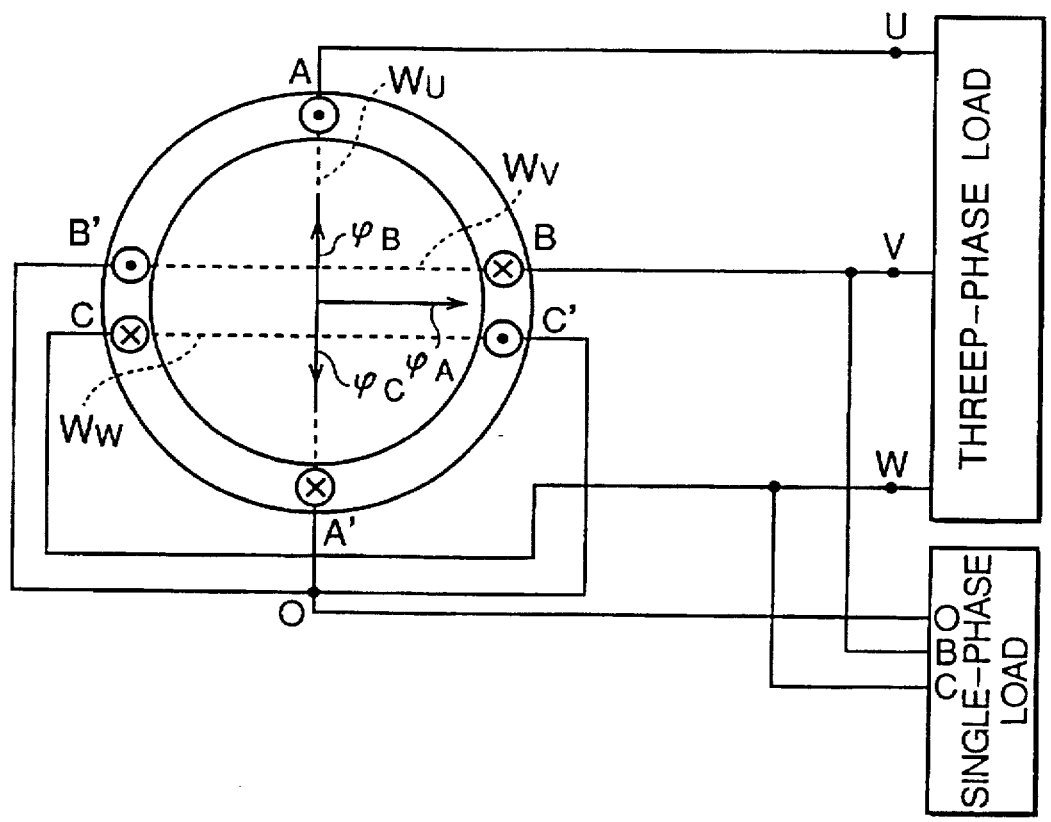
FIG. 4 is a diagram showing relative relationship of the stator windings.
Figure 5:
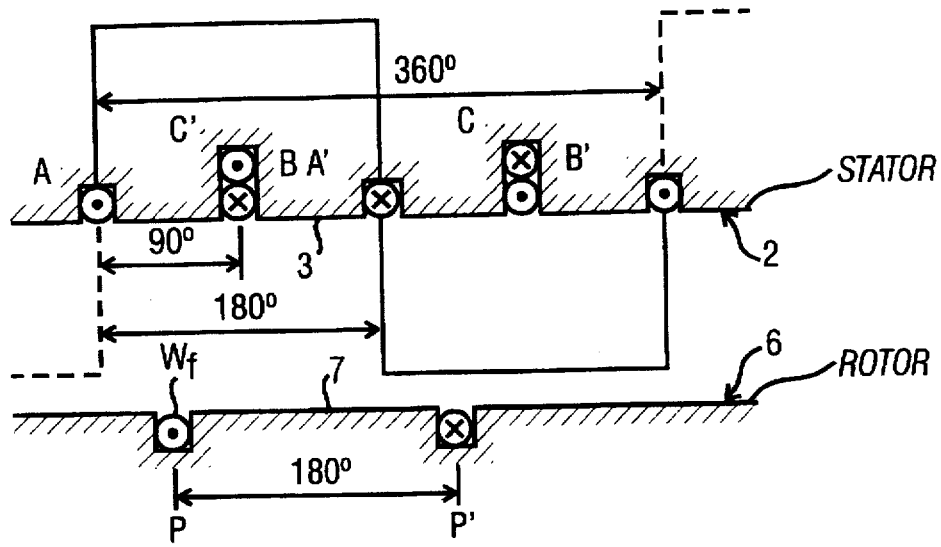
FIG. 5 is a diagram showing magnetic flux distribution at the stator side.
Figure 6:
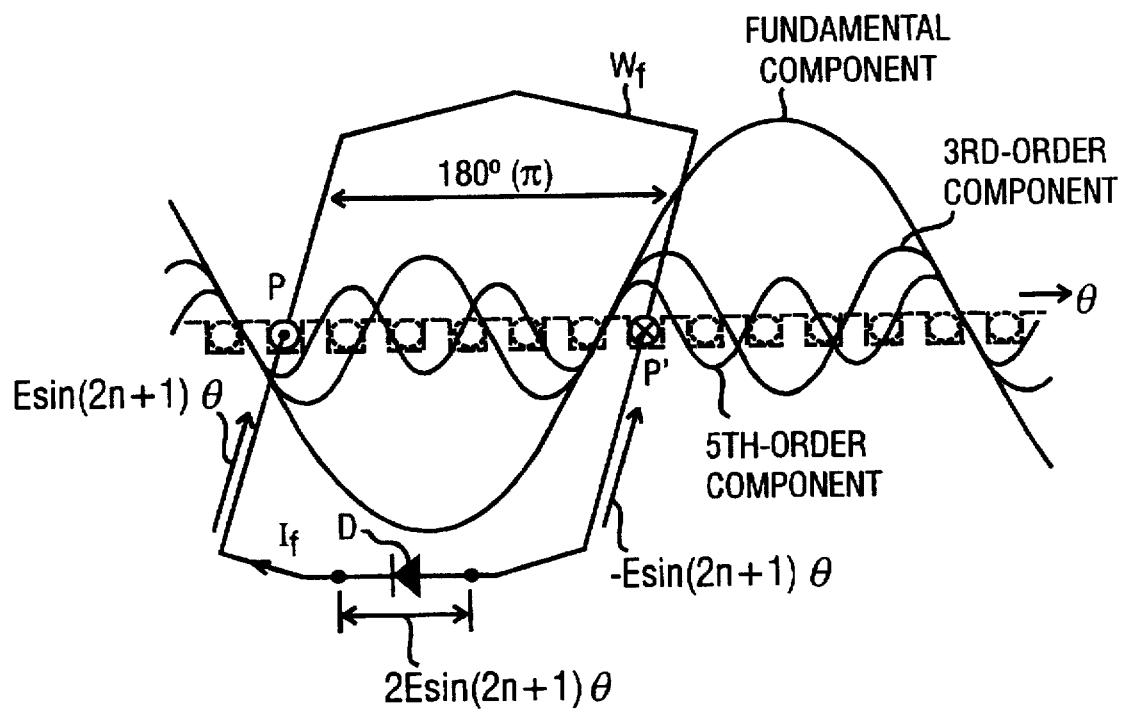
FIG. 6 is a diagram showing a state wherein the spatial harmonic components and the field windings are magnetically coupled.

Now, a three-phase brushless self-excited synchronous generator of a first embodiment according to the invention is explained hereunder with reference to FIGS. 2–6. FIG. 2 shows a circuit diagram of the generator of the first embodiment according to the invention, FIG. 3 shows current waveforms flowing in each of the windings of the three-phase primary generating windings, FIG. 4 shows electrical relative relationships of the stator windings, FIG. 5 shows magnetic flux distribution at the stator side of the generator of the first embodiment, and FIG. 6 shows a state wherein the spatial harmonic components and the field windings are magnetically coupled with each other.

First, the circuit structure of the stator 2 is explained with reference to FIGS. 2, 4, and 5. On the slots (not shown in the drawings) of the stator core 3, there are wound first to third single-phase windings $W_U$, $W_V$ and $W_W$. It should be noted that the second and third single-phase windings $W_V$ and $W_W$ are wound on the stator core 3 at the positions where they are electrically orthogonal (90° in the electrical angle) to the position where the first single-phase winding $W_U$ is wound.

The winding number of the second single-phase winding $W_V$ is the same as that of the third single-phase winding $W_W$. It should be noted that the winding number of the first single-phase winding $W_U$ is 3½ times that of the second single-phase winding $W_V$ or the third single-phase winding $W_W$. One end terminal A' of the first single-phase winding $W_U$, the winding-end terminal B' of the second single-phase winding $W_V$, and the winding-start terminal C' of the third single-phase winding $W_W$ are connected together at the connection point O, thereby forming T-connection primary generating windings.

In the above T-connection, the other end terminal A of the first single-phase winding $W_U$, the winding-start terminal B of the second single-phase winding $W_V$ and the winding-end terminal C of the third single-phase $W_W$ constitute three-phase output terminals U, V, and W. Further, the winding-start terminal B of the second winding $W_V$, the winding-end terminal C of the third winding $W_W$, and the above connection point O constitute the single-phase output terminals B, O and C from which, for example, single-phase three-line 100/200 volt outputs can be derived.

The stator excitation windings $W_e$ are connected to the center taps u, v, w of the three-phase primary generating windings $W_U$, $W_V$, $W_W$ through the control rectifier means 5. The control rectifier means 5 is formed by three-phase full-wave rectifier diodes $R_D$ and the variable resistor $R_r$. This control rectifier means 5 is arranged outside the generator. In the case where the three-phase full-wave rectifier means are constituted by controllable semiconductor devices such as thyristors, the variable resistor $R_r$ can be dispensed with.

Next, the structure of the rotor 6 is explained with reference to FIGS. 2 and 5. A plurality of field windings $W_f$ are wound on the rotor core 7. Each of the field windings $W_f$ is so arranged on the slots that it is magnetically coupled with both the odd-order spatial higher harmonic components of the armature reaction magnetic fields based on the currents $I_1$, $I_2$, $I_3$ flowing in the three-phase primary generating windings and the spatial fundamental component of the static magnetic field based on the current $I_e$ in the stator excitation windings $W_e$. The plurality of field windings $W_f$ are respectively short-circuited by the diodes D. More specifically, the plurality of field windings $W_f$ of the rotor 6 are wound on the rotor core 7, that is, wound sequentially in a given number of slots provided in the rotor core 7, in such a manner that the individual field windings $W_f$ have the same pole pitch, that is, 180° in the electric angle as that of the primary generating windings, whereby the field windings $W_f$ are magnetically coupled with the static magnetic field produced by the stator excitation windings $W_e$.

In the generator having the above structure, when the rotor 6 on which the plurality of field windings $W_f$ are wound is rotated, the electromotive forces are slightly induced in the primary windings $W_U$, $W_V$, $W_W$ due to the residual magnetism in the rotor core 7. The electromotive forces thus induced influence on the field windings $W_f$ through the following two functions.

One function is as follows. As the three-phase primary generating windings are such that the three single-phase windings $W_U$, $W_V$, $W_W$ are connected in a T-shape, as shown in FIG. 3, when the current $I_1$ is the maximum at the timing Q, the current $I_2$ is the same as the current $I_3$ ($I_2=I_3$). Among the magnetic fluxes $\Phi_A$, $\Phi_B$, $\Phi_C$ produced by the currents flowing in the single-phase windings, respectively, $\Phi_B$ is in the same magnitude and in the opposite direction as $\Phi_C$ so that they cancel each other, since the second and third single-phase windings $W_V$, $W_W$ are connected in series with each other. As a result, only the magnetic flux $\Phi_A$ produced by the first single-phase winding $W_U$ which is electrically orthogonal to both the second and third single-phase windings $W_V$, $W_W$ exists. The spatial magnetic flux distribution by the magnetic flux $\Phi_A$ produced around the stator core 3 by the first single-phase winding $W_U$ can be shown in FIG. 5 in the case where the primary generating windings are of concentrated winding type. The present invention is also applicable to the case wherein the primary generating windings are of distributed winding type. However, in this case, the spatial magnetic flux distribution takes a step form.

The following equation (1) is obtained by Fourier transformation of the square wave shown in FIG. 5.

$$y(\theta) = \frac{4\Phi A}{\pi} \left( \sin\theta + \frac{1}{3}\sin3\theta + \frac{1}{5}\sin5\theta + \ldots \right) \quad (1)$$

As shown in the equation, other than the fundamental wave in the first term, such odd-order spatial higher harmonic components as the third-order spatial higher harmonic component and the fifth-order spatial higher harmonic component are included. The voltage based on the odd-order spatial harmonic components induced in the field windings P, P' of the rotor which are located at the position where they are magnetically coupled with the spatial harmonic components, that is, which have a pitch of 180° in the electric angle as shown in FIG. 6, is given in the following equation (2).

On the assumption that the induced voltage in the P conductor is $E \sin(2n+1)\theta$, the induced voltage in the P' conductor is given as:

$$E\sin(2n+1)(\theta + \pi)$$
Thus,
$$\begin{aligned} E\sin(2n+1)(\theta+\pi) &= E\sin[(2n+1)\theta + (2n+1)\pi] \quad (2) \\ &= E\sin(2n+1)\theta\cos(2n+1)\pi + \\ &\quad E\cos(2n+1)\theta\sin(2n+1)\pi \\ &= -E\sin(2n+1)\theta \end{aligned}$$

wherein, $E = Em \cos\omega t$ (Em being a constant according to structure and materials).

As shown in FIG. 6, the induced voltages in the field windings P and P', in the case where they are wound on the rotor 6 as the field windings $W_f$ and which are short-circuited by the rectifier element (diode) D, are rectified by the diode D and the rectified current flows in the field windings $W_f$. The DC current components form the magnetic poles in the rotor and increase the primary magnetic fields of the rotor. As a result, the voltages induced in the primary generating windings $W_U$, $W_V$, $W_W$ are increased. Though the above explanation is made for the timing when the current $I_1$ is the maximum, operation at other timings can readily be understood.

The other function is as follows. In the stator excitation windings $W_e$, there flow DC currents $I_e$ which are obtained by full-wave rectifying the slight induced electromotive forces in the primary generating windings $W_U$, $W_V$, $W_W$ by the three-phase full-wave rectifier $R_D$ of the control rectifier means 5 connected between the center taps u, v, w of the primary generating windings $W_U$, $W_V$, $W_W$ and the stator excitation windings $W_e$, whereby the static magnetic field is produced by the stator excitation windings $W_e$. This magnetic field causes the overlapped electromotive forces to be induced in each of the field windings $W_f$. The electromotive forces thus induced are respectively half-wave rectified by the series diodes D, so that the primary magnetic flux of the rotor 6 is increased and the electromotive forces induced in the primary generating windings $W_U$, $W_V$, $W_W$ are increased accordingly.

By the repetition of the above operations, the generating voltage by the primary generating windings $W_U$, $W_V$, $W_W$ is established. Here, the currents $I_e$ flowing in the stator excitation windings $W_e$ are controlled by the adjustment of the variable resistor $R_f$ in the full-wave rectifier $R_D$, so that the voltage of the generator 1 at the non-loaded state can be freely controlled.

In the case where there exists no residual magnetism in the rotor 6, the battery (not shown) may be temporarily connected to the stator excitation windings $W_e$ of the stator, so that an electromotive force is induced in the field windings $W_f$ of the rotor 6. A half-wave rectified current based on this electromotive force causes the primary magnetic field to be induced in the rotor 6.

Next, when the three-phase resistors or inductive loads are connected to this generator 1, the operation thereof is as follows. When the three-phase resistors or inductive loads are connected to the generator 1, the loads current $I_1$, $I_2$, $I_3$ flow out from the primary generating windings $W_U$, $W_V$, $W_W$, and due to these load currents $I_1$, $I_2$, $I_3$ the armature reaction magnetic fields produced by the primary generating windings $W_U$, $W_V$, $W_W$ increase. Therefore, the spatial higher harmonic components of the armature reaction magnetic fields also increase, the respective electromotive forces induced in the plurality of field windings $W_f$ individually wound at the positions where they are magnetically coupled with the above spatial higher harmonic components increase, and thus the field currents $I_f$ flowing in the respective field windings increase. As a result, the electromotive forces induced in the primary generating windings increase, so that the variations in the output voltages against the increase in the impedance voltage drop are compensated. Namely, in the generator according to the invention, the increase and decrease in the loads currents $I_1$, $I_2$, $I_3$ in accordance with the increase and decrease in the loads results in the increase and decrease in the field current $I_f$ of the rotor and, as a result, the electromotive forces induced in the primary generating windings $W_U$, $W_V$, $W_W$ increase or decrease, whereby the increase or decrease in the impedance voltage drop in the primary generating windings is compensated. Consequently, the generator 1 generates substantially constant output voltage (flat-compound characteristics) irrespective of the increase or decrease in the loads.

Further, in the generator according to the invention, even if the loads of the three-phase unbalanced or single-phase are connected thereto, the spatial fundamental component of the opposite phase of the armature reaction magnetic fields newly produced by the three-phase unbalanced currents in the primary generating windings causes an electromotive force to be induced in each of the plurality of the field windings so that the series excitation effects of the field systems are achieved. Consequently, the decrease in the series excitation effects of the field systems based on the decrease in the spatial higher harmonic components of the armature reaction magnetic fields caused by the three-phase unbalanced currents is compensated, whereby the output voltage of the generator is compensated against the variations in the loads.

An automatic voltage regulator (AVR) may be connected to the stator excitation windings $W_e$ in the case where the excitation is insufficient. Further, prior art techniques for DC excitation of the stator can be applied to the generator of the present invention.

Figure 7:
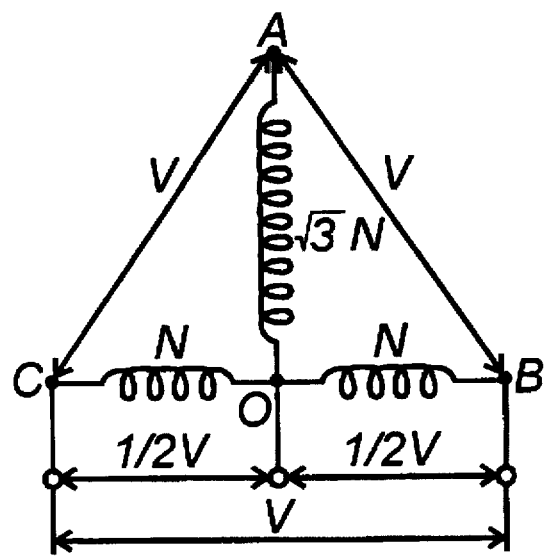
FIG. 7 is a diagram for explaining the primary generating windings.

In the generator according to the present invention, the primary generating windings $W_U$, $W_V$, $W_W$ are connected in a T-shape and the number of winding of the first single-phase winding of the primary generating windings $W_U$, $W_V$, $W_W$ is 3½ times that of each of the second and third single-phase windings as shown in FIG. 7. If the voltage among the output terminals A, B and C is V volts, the voltage between the terminal A and the connection point O is 3½/2 V volts and the voltage between the terminal B and the point O or the voltage between the terminal C and the point O is ½ V volts, respectively. As the ratio between 3½/2 V and ½ V is 3½, if the winding number of the windings between the terminals B and O and that between the terminals C and O are N, the winding number of the windings between the terminals A and O becomes 3½. As a result, if the winding number of the windings between the terminals A and O is made 3½ times that of the windings between the terminals B and O or the terminals C and O, the three-phase balanced output voltage V can be obtained from the output terminals A, B, and C. At the same time, the single-phase three-line output can be obtained from the terminals B, O and C because the voltage between the terminals B and O or the terminals C and O is ½ V volts and the voltage between the terminals B and C is V volts.

Figure 8:
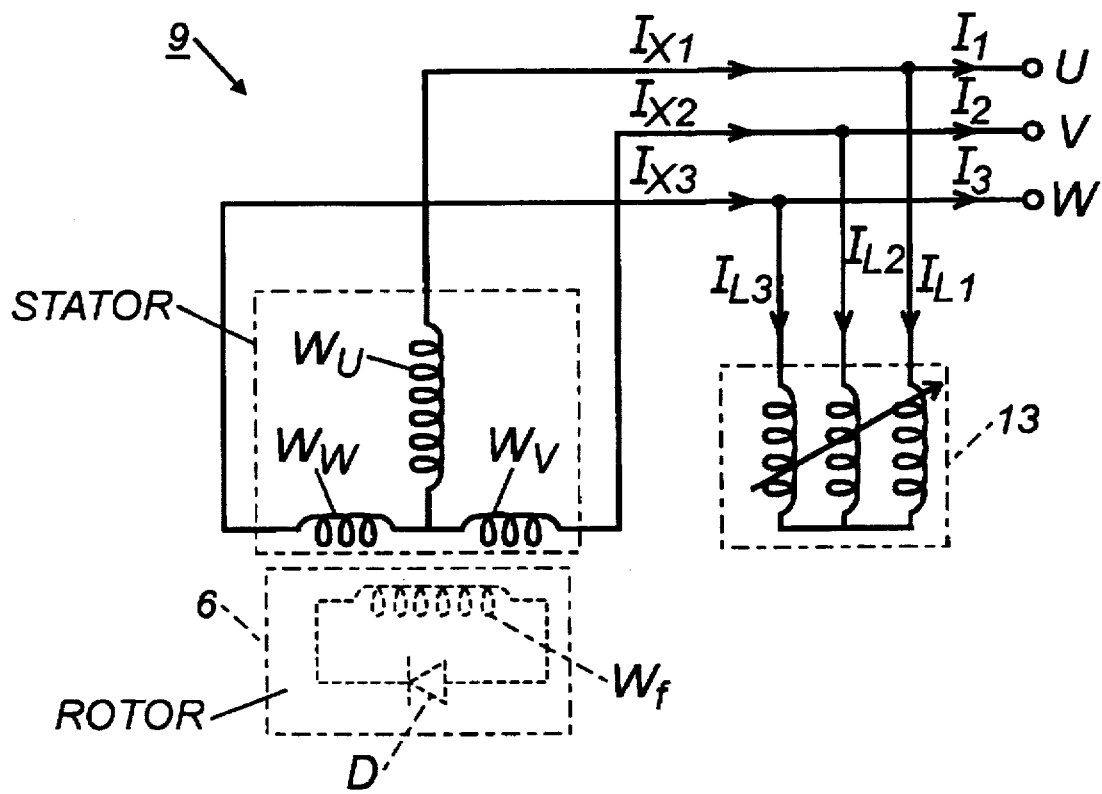
FIG. 8 is a circuit diagram showing a three-phase brushless self-excited synchronous generator of a second embodiment according to the invention.

Next, the second embodiment according to the present invention is explained with reference to FIG. 8. FIG. 8 shows the circuit diagram of the three-phase brushless synchronous generator. As the rotor in this embodiment is the same as the rotor 6 in the first embodiment explained above, illustration thereof in FIG. 8 and explanation therefor are omitted here. On the slots of the stator core, there are wound first to third single-phase windings $W_U$, $W_V$ and $W_W$. The second and third single-phase windings $W_V$ and $W_W$ are wound on the stator core 3 at the positions where they are electrically orthogonal (90° in the electrical angle) to the position where the first single-phase winding $W_U$ is wound. The winding number of the second single-phase winding $W_V$ is the same as that of the third single-phase winding $W_W$. The winding number of the first single-phase winding $W_U$ is 3½ times that of the second single-phase winding $W_V$ or the third single-phase winding $W_W$. One end terminal A' of the first single-phase winding $W_U$, the winding-end terminal B' of the second single-phase winding $W_V$, and the winding-start terminal C' of the third single-phase winding $W_W$ are connected together at the connection point O, thereby forming T-connection primary generating windings. In this embodiment, to the three-phase output terminals U, V, and W, a reactor 13 is connected in parallel together with loads.

In the generator having the above structure, when the rotor 6 on which the plurality of field windings $W_f$ are wound is rotated, the electromotive forces are slightly induced in the primary windings $W_U$, $W_V$, $W_W$ due to the residual magnetism in the rotor core 7. The electromotive forces thus induced influence on the field windings $W_f$ through the two functions. One of the two functions which is based on the T-connection of the three-phase primary generating windings is the same as that explained in the first embodiment, the explanation thereof is not repeated here.

The other function of the two functions is as follows. Reactor currents $I_{L1}$, $I_{L2}$ and $I_{L3}$ flow in the primary generating windings and the variable reactor 13. An armature reaction magnetic field is produced based on the currents flowing in the primary generating windings $W_U$, $W_V$ and $W_W$. An electromotive force is induced in each of the plurality of field windings $W_f$ of the rotor 6 which are magnetically coupled with the odd-order spatial higher harmonic components of the above armature reaction magnetic field. The electromotive forces thus induced in the field windings of the rotor are respectively half-wave rectified by the diodes D respectively connected in series with the field windings, so as to increase the primary magnetic fields of the rotor 6, thereby increasing the electromotive forces induced in the primary generating windings $W_U$, $W_V$, and $W_W$. By the repetition of the above operations, the generated output voltage of the primary generating windings $W_U$, $W_V$, and $W_W$ is established. Here, by adjusting the variable reactor 13 so as to control the reactor currents $I_{L1}$, $I_{L2}$, and $I_{L3}$, the output voltage of the generator 9 at the non-loaded state can be freely controlled.

In the case where there exists no residual magnetism in the rotor 6, the battery may be temporarily connected to the primary generating windings so that an electromotive force is induced in the field windings of the rotor. A half-wave rectified current based on this electromotive force causes the primary magnetic field to be slightly induced in the rotor.

Next, when the three-phase inductive or capacitive loads are connected to this generator 9, the operation thereof is as follows. When the three-phase loads are connected to the generator 9, there flow vector sum currents $I_{x1}$, $I_{x2}$, $I_{x3}$ of the load currents $I_1$, $I_2$, $I_3$ and the reactor currents $I_{L1}$, $I_{L2}$, $I_{L3}$ in the primary generating windings $W_U$, $W_V$, $W_W$. Therefore, due to the effects of the reactor 13, even if the magnitudes of the load currents $I_1$, $I_2$, $I_3$ are constant, the magnitudes of the currents to flow in the primary generating windings $W_U$, $W_V$, $W_W$ increase as the lagging degree of power factor of the loads increases, while the magnitudes of the same decrease as the leading degree of the power factor of the loads increases. The increase and decrease of the vector sum currents result in the increase and decrease of the armature reaction magnetic fields produced by the primary generating windings $W_U$, $W_V$, $W_W$. Therefore, the spatial higher harmonic components of the armature reaction magnetic fields increase or decrease, the electromotive forces respectively induced in the plurality of field windings $W_f$ which are individually wound at the positions where they are magnetically coupled with the spatial higher harmonic components increase or decrease and, thus, the half-wave rectified currents $I_f$ in the field windings increase or decrease. As a result, the induced electromotive forces in the primary generating windings increase or decrease. In this way, in the generator 9 of the second embodiment according to the invention, as the lagging degree of the power factor of the loads increases, the series excitation effects of the field windings increase so that the output voltage is prevented from lowering. On the other hand, as the leading degree of the power factor of the load increases, the series excitation effects of the field windings decrease so that rising of the output voltage based on the self-excitation phenomena by the phase-advancing currents is prevented from occurring. Namely, this generator 9 has an automatic voltage regulating (AVR) function in itself which is capable of appropriately responding to the variations in the load power factors.

When a plurality of field windings having the same number of poles as that of the stator primary windings are to be wound on the rotor core of the generator in the first or second embodiment, the plurality of field windings may be arranged on the rotor core so as to be magnetically coupled with the odd-order spatial higher harmonic components.

Further, in the generator according to this embodiment, even when three-phase unbalanced or single-phase loads are connected thereto, since the spatial fundamental component of an opposite phase of the armature reaction magnetic fields newly produced by the three-phase unbalanced currents flowing in the primary generating windings causes an electromotive force to be induced in each of the plurality of field windings and results in the series excitation effects of the field system, the decrease in the series excitation effects of the field system caused by the decrease in the spatial higher harmonic components of the armature reaction magnetic fields by the three-phase unbalanced currents is compensated. Consequently, the output voltage of the generator is kept constant against the variations in the loads by the control of the excitation currents. In this embodiment, the third-order spatial higher harmonic component which is the maximum term of the higher harmonic components is effectively utilized, the necessary amount of controlling the excitation current is little.

As has been explained hereinabove, in the brushless synchronous generator according to the invention, rotor excitation windings becomes unnecessary which have been indispensable in the conventional generators. As a result, the rotor can be constructed in simple and rigid by the rotor field windings and the semiconductor rectifier means. Next, since there is no limitation in the number of slots in the rotor, the magnetic vibrations and noise caused by the combinations of the number of slots in the stator and rotor cores are effectively suppressed. The time constant of the rotor circuit becomes small due to the elimination of the rotor excitation windings, so that the response speed of the controlling of the output voltage becomes fast.

Further, since the rotor is so constructed that it is magnetically coupled with all the odd-order harmonic components of the armature reaction magnetic fields and the static magnetic fields, in any case where three-phase balanced loads, three-phase unbalanced loads or single-phase loads are connected to the generator, the series excitation effects can be further enhanced, whereby the output voltage of the generator can be more effectively compensated against the variations in the loads.

According to the present invention, with the simple structure, that is, with the provision of the T-connection primary generating windings, not only the three-phase outputs but also the single-phase three-line outputs can be derived simultaneously from the same generator.

As explained hereinabove, according to the present invention, there is provided a three-phase brushless self-excited synchronous generator attaining a great advantageous effects.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A three-phase self-excited synchronous generator comprising:

a stator having a stator core, primary generating windings and excitation windings having the number of poles odd-number times the number of poles of said primary generating windings, said primary generating windings having T-connection first, second and third single-phase windings which are connected with one another such that one end of said first single-phase winding connected to one end each of said second and third single-phase windings which are respectively electrically orthogonal to said first single-phase winding;

a rotor having a rotor core and a plurality of field windings wound on said rotor core, having the same number of poles as that of said primary generating windings, said plurality of field windings being arranged at positions where they are magnetically coupled with both static magnetic fields produced by said excitation windings and odd-order spatial higher harmonic components of armature reaction magnetic fields produced by said primary generating windings;

a control rectifier means connected between said primary generating windings and said excitation windings, for full-wave rectifying electromotive forces induced in said primary generating windings so that direct currents flow in said excitation windings; and a plurality of semiconductor rectifier elements respectively connected in series to said plurality of field windings, for half-wave rectifying electromotive forces respectively induced in said plurality of field windings so that DC currents flow in said plurality of field windings.

2. A three-phase brushless self-excited synchronous generator according to claim 1, wherein said control rectifier means comprises a three-phase full-wave rectifier and a variable resistor.

3. A three-phase brushless self-excited synchronous generator according to claim 1, wherein said control rectifier means has a three-phase full-wave rectifier formed by a controllable semiconductor rectifier element.

4. A three-phase brushless self-excited synchronous generator according to claim 1, wherein each of said plurality of field windings is sequentially provided, with an electric angle of 180° corresponding with a pole pitch of said primary generating windings, on a given number of slots provided in said rotor core with regular intervals.

5. A three-phase brushless self-excited synchronous generator according to claim 1, wherein winding number of said first single-phase winding is 3½ times that of each of said second single-phase winding and said third single-phase winding.

6. A three-phase self-excited synchronous generator by comprising:

a stator having a stator core, primary generating windings and excitation windings having the number of poles odd-number times the number of poles of said primary generating windings, said primary generating windings having T-connection first, second and third single-phase windings which are connected with one another such that one end of said first single-phase winding is connected to one end each of said second and third single-phase windings which are respectively electrically orthogonal to said first single-phase winding;

a reactor connected in parallel together with loads to output terminals of said primary generating windings;

a rotor having a rotor core and a plurality of field windings wound on said rotor core, having the same number of poles as that of said primary generating windings, said plurality of field windings being arranged at positions where they are magnetically coupled with both static magnetic fields produced by said excitation windings and odd-order spatial higher harmonic components of armature reaction magnetic fields produced by said primary generating windings; and a plurality of semiconductor rectifier elements respectively connected in series to said plurality of field windings, for half-wave rectifying electromotive forces respectively induced in said plurality of field windings so that DC currents flow in said plurality of field windings.

7. A three-phase brushless self-excited synchronous generator according to claim 6, wherein said reactor is a variable reactor in which reactor excitation currents are controllable.

8. A three-phase brushless self-excited synchronous generator according to claim 6, wherein each of said plurality of field windings is sequentially provided, with an electric angle of 180° corresponding with a pole pitch of said primary generating windings, on a given number of slots provided in said rotor core with regular intervals.

9. A three-phase brushless self-excited synchronous generator according to claim 6, wherein winding number of said first single-phase winding is 3½ times that of each of said second single-phase winding and said third single-phase winding.

* * * * *